United States Patent [19]

Beatty et al.

[11] Patent Number: 5,537,608
[45] Date of Patent: Jul. 16, 1996

[54] PERSONAL COMMUNICATOR APPARATUS

[75] Inventors: Brent A. Beatty, Boca Raton; Francis J. Canova, Jr., Boynton Beach; Charles S. Lanier, Delray Beach; Wayne P. Whitley, Boca Raton; Debra A. G. Johnson, Ft. Lauderdale, all of Fla.

[73] Assignee: International Business Machines Corporation, Armonk, N.Y.

[21] Appl. No.: 459,552

[22] Filed: Jun. 2, 1995

Related U.S. Application Data

[63] Continuation of Ser. No. 976,127, Nov. 13, 1992, abandoned.

[51] Int. Cl.$^6$ ................................................. G06F 13/00
[52] U.S. Cl. ........................... 395/800; 364/DIG. 1; 364/232.91; 364/231.1; 364/243
[58] Field of Search ................................. 395/200, 800, 395/650, 700, 375, 425; 379/59, 58, 98, 57

[56] References Cited

U.S. PATENT DOCUMENTS

| | | | |
|---|---|---|---|
| 4,481,382 | 11/1984 | Villa-Real | 179/2 EA |
| 4,825,448 | 4/1989 | Critchlow et al. | 375/8 |
| 4,916,441 | 4/1990 | Gombrich | 235/380 |
| 4,949,248 | 8/1990 | Caro et al. | 395/725 |
| 5,008,925 | 4/1991 | Pireh | 379/60 |
| 5,008,927 | 4/1991 | Weiss et al. | 379/98 |
| 5,020,093 | 5/1991 | Pireh | 379/59 |
| 5,029,233 | 7/1991 | Metroka | 455/11 |
| 5,050,207 | 9/1991 | Hitchcock | 379/96 |
| 5,063,600 | 11/1991 | Norwood | 382/13 |
| 5,127,050 | 6/1992 | Takahashi et al. | 379/428 |
| 5,138,649 | 8/1992 | Krisbergh et al. | 379/56 |
| 5,189,593 | 2/1993 | Ooi | 455/195.1 |
| 5,195,130 | 3/1993 | Weiss et al. | 379/98 |
| 5,201,067 | 4/1993 | Grube et al. | 455/89 |
| 5,227,614 | 7/1993 | Danielson et al. | 235/380 |
| 5,249,218 | 9/1993 | Sainton | 379/59 |
| 5,260,697 | 11/1993 | Barrett et al. | 345/173 |
| 5,347,632 | 9/1994 | Filepp et al. | 395/200 |

OTHER PUBLICATIONS

9075 PCradio Hardware Interface Technical Reference, IBM, 1992 pp. 1–1 to 6–63.
9075 PCradio Guide to Operations, IBM, 1992, pp. 1–1 to D–5.
Danny Goodman, "The Hyber Card 2.2 Handbook", Random House, Fourth Edition, No Date.
Data sheet, VG–230 Single–Chip PC Platform VADEM, Sep. 1992.

Primary Examiner—Mehmet B. Geckil
Attorney, Agent, or Firm—George E. Grosser; Andrew J. Dillon

[57] ABSTRACT

A personal communication apparatus includes a digital processor, a memory coupled to the processor, an operating system, stored in the memory and executable by the processor, a touch-screen user interface coupled to the processor and the memory and responsive to file execution commands from the user, and a navigation utility file, executable by the processor, for initiating execution of files and for monitoring the sequence in which file executions occur. The Navigation utility maintains a stack in the memory into which the calling sequences of files are stored according to the order in which files were executed. In one embodiment, the apparatus further comprises a modem and RF transceiver coupled to the processor for receiving and transmitting data. In another embodiment, the communicator further includes a port for receiving an external memory medium containing a plurality of executable files.

4 Claims, 10 Drawing Sheets

BATTERY
SIGNAL

CALCULATOR

ACCESS MAIL LISTS:

| 0 INCOMING MESSAGES |
| --- |
|  |
|  |
| CREATE NEW MAIL |

CHECK POST OFFICE

| SEND OUTGOING MAIL |
| --- |
| RECEIVE INCOMING MAIL |
| SEND AND RECEIVE MAIL |
| CHANGE CONFIGURATION |

STATUS

| SUCCESS, NEXT OPTION |
| --- |

| BACK | PHONE | TOOLS | HELP |
| --- | --- | --- | --- |

FIG. 3C

| ALVAREZ 4481879 | WILSON 8820854 | DEPAR |
| --- | --- | --- |
| CONOVA 8828080 | BEATTY 8825182 | |
| DEUSER MAR 4481482 | | SCHOO |
| | | |
| | | FRIEN |
| | | |
| | | EMERG |
| | | |

| FIND | KEYPAD ON | CLR | EXIT |
| --- | --- | --- | --- |
| HELP | PHONE | TOOLS | BACK |

CALENDAR

↑  OCTOBER 19, 1992  ↓

|  o  |  o  |  o  |  o  |  1  |  2  |  3  |
|-----|-----|-----|-----|-----|-----|-----|
|  4  |  5  |  6  |  7  |  8  |  9  | 10  |
| 11  | 12  | 13  | 14  | 15  | 16  | 17  |
| 18  | 19  | 20  | 21  | 22  | 23  | 24  |
| 25  | [26]| 27  | 28  | 29  | 30  | 31  |

1:00PM - 3:00PM
    STATUS MTG, O14/C914

2:00PM WEEKLY TELECON
    W/ MAN @

3:30PM MULTI-IMAGE GROUP
    MEETING

5:45PM SIGN OUT !!!

1:00PM - 3:00PM
    STATUS MTG, O14/C914

2:00PM WEEKLY TELECON
    WITH MAN @

3:30PM MULTI-IMAGE GROUP
    MEETING

5:45PM SIGN OUT!!!

1:00PM - 3:00PM COMDEX

PERSONAL COMMUNICATOR APPARATUS

This is a continuation of application Ser. No. 07/976,127, filed Nov. 13, 1992, now abandoned.

BACKGROUND OF THE INVENTION

Cellular telephones have gained widespread popularity in recent years. These telephones allow users to communicate over a cellular network via a radio frequency (RF) transceiver present within the telephone. Many cellular telephones contain digital microprocessors which control operation of the RF transceiver and provide limited telephone-type functions to the user, such as autodialing and/or displaying stored telephone numbers. Such cellular telephones, however, lack the memory, display and user interface facilities necessary to execute many of the personal organizer applications found on personal computers.

More recently, a lap-top computer which contains an RF transceiver as a means for data input/output has become commercially available. This product, the PC Radio, available from International Business Machines Corporation, Boca Raton, Fla., provides the functionality of a personal computer with the capability of receiving and sending data over a cellular phone. However, a need still exists for a personal communication apparatus which can execute the personal organizer available on a personal computer, such as electronic mail, calculator, address book, and calendar, and which can further provide the functionality of a cellular telephone.

A portable communication apparatus is proposed herein that integrates the functionality of a personal computer with the communication possibilities of a cellular telephone to provide an apparatus with sophisticated computing as well as communication functions.

SUMMARY OF THE INVENTION

The foregoing and other objects of the present invention are achieved with a personal communication apparatus comprising a digital processor, a memory coupled to the processor, an operating system program stored in the memory and executable by the processor, a touch-sensitive user interface, coupled to the processor and the memory, and responsive to file execution commands from the user, and, a navigation file executable by the processor, in tandem with an executable file, initiates execution of files and monitors the sequence in which file executions occur.

In one embodiment, the user interface facility comprises a liquid crystal display in combination with a touch-sensitive overlay to provide a touch-sensitive virtual user interface. In another embodiment, the apparatus further comprises an RF transceiver to allow for communication via a cellular network with other communication systems.

The invention will be more fully understood from the detailed descriptions set forth below which should be read in conjunction with the accompanying drawings. The invention is defined in the claims appended at the end of the detailed description, which is offered by way of example only.

BRIEF DESCRIPTION OF THE DRAWINGS

In the drawings:

FIGS. 3A–E illustrate various virtual user interfaces in accordance with exemplary applications executable on the personal communication apparatus of FIG. 1;

DETAILED DESCRIPTION OF THE INVENTION

Figure 1:
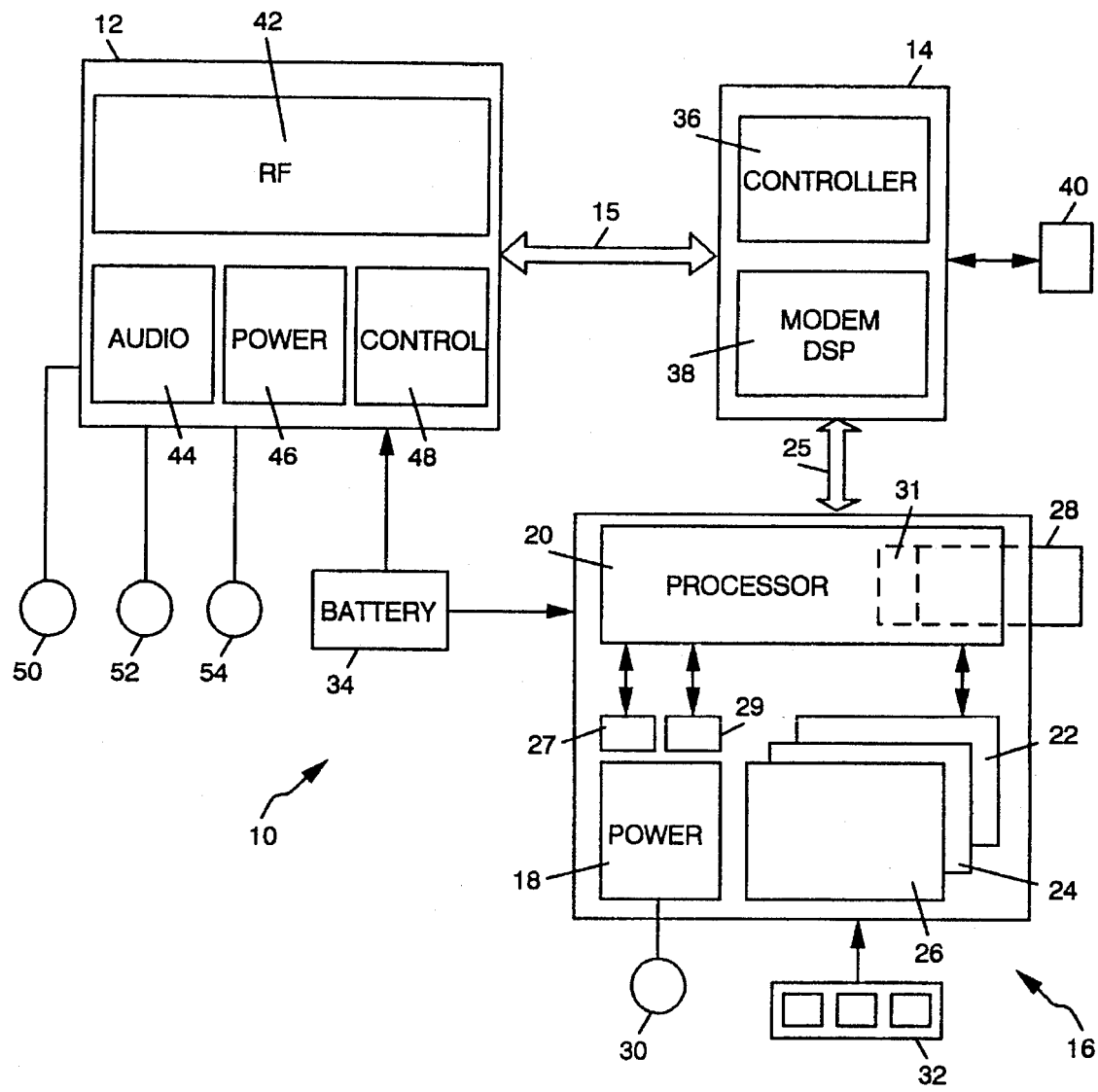
FIG. 1 is a schematic block diagram of a personal communication apparatus in accordance with the present invention.

In the various Figures, the same designations are used for similar elements. Referring to the drawings, and, in particular to FIG. 1 thereof, a schematic block diagram of a personal communicator 10, according to an illustrative embodiment of the present invention is shown. Communicator 10 comprises, in a simple embodiment, a transceiver 12, modem 14, and central controller 16 in conjunction with other elements, as described hereinafter in greater detail.

Transceiver 12 comprises RF logic 42, audio logic 44, power logic 46 and control logic 48. RF logic 42 contains the elements for the transmission and reception of radio frequency signals. Audio logic 44 contains the elements necessary for the generation and reception of audio signals such as amplifiers, digital-to-analog converters, etc. Power logic 46 interfaces with main battery 34, as indicated, and supplies power to the elements of transceiver 12. Control logic 48 supplies control signals to RF logic 42, audio logic 44 and power logic 46 to control their respective functions within transceiver 12. The construction and function of transceiver 12 is within the scope of those reasonably skilled in the art. A transceiver 12, suitable for use in the present invention is commercially available from Motorola Corporation, Schlumberg, Ill., and is similar to that used in the Digital Personal Communicator Telephone from Motorola. A speaker 52 and microphone 54 are coupled to audio logic 44 to allow audio data to be received and transmitted, respectively by the user. In addition, a ringer 50, is coupled to audio logic 44 to alert the user of an incoming call. The construction and function of ringer 50, speaker 52 and microphone 54, as well as their interconnections and connections with audio logic 44 are likewise within a scope of one reasonable skilled in the arts. Transceiver 12 is coupled to central controller 16 by modem 14.

Modem 14 comprises a modem controller 36 and a modem digital signal processor (DSP) 38. In the illustrative embodiment, modem controller 36 and modem DSP 38 coact to provide a command driven modem with 2400 baud full duplex data transfer capabilities. The construction and function of modem controller 36 and modem DSP 38, as well as their interconnection, are within a scope of those reasonably skilled in the arts. The construction and operation of controller 36 and modem DSP 38 and the functionality provided by these devices are well-known and are found in a number of commercially available chip sets for providing modem capabilities to computer systems. Examples of such chip sets which are suitable for use in the present invention are Data/Fax/Voice Modem Device Sets Model Nos.

CL-MD9624ECT and CL-MD9624AT/EC2 commercially available from Cirrus Logic, Inc., 3100 West Warren Avenue, Fremont, Calif. 94538. Modem 14 interacts with transceiver 12 via a number of audio, control and power signals collectively illustrated in FIG. 1 as bus 15. An external connector 40, such as an 8-Pin connector, is coupled to modem 14, as illustrated, to allow for coupling modem 14 to external devices, such as another modem, a computer, etc. Modem 14 is coupled to central controller 16 via a number of power, control and audio signal lines collectively illustrated in FIG. 1 as bus 25.

Central controller 16 comprises microprocessor 20, power control logic 18, backlight circuitry 22, liquid crystal display (LCD) 24, and touch overlay 26. Backlight circuitry 22, LCD 24 and touch overlay 26 collectively define user interface 35 on which virtual keyboard configuration may be displayed, as explained hereinafter. Central controller 16 further comprises a RAM memory 27 and a ROM memory 29 coupled to processor 20. Main battery 34 and backup battery 30 are coupled to power control logic 18, as illustrated. Backup battery 30 maintains all volatile memory upon removal of main battery 34. In addition, a number of pushbuttons 32, such as power, and volume/contrast controls are coupled to controller 16.

Processor 20, in the illustrative embodiment, embodies the complete architecture of an IBM PC/XT computer on a single chip. Processor 20 includes a CGA LCD interface through which it communicates with LCD 24, and a matrix interface through which it communicates with touch overlay 26 in a manner similar to a conventional alpha-numeric keyboard. Processor 20 communicates with modem controller 36 through a serial interface, and further communicates with power control logic 18 through a number of signals which supply power to the processor and further alert the processor of low power in the battery. A processor suitable for use in the present invention as processor 20 is commercially available from Vadem, Inc., San Jose, Calif.; Model No. VG230.

Controller 16 does not contain a disk drive but instead includes a Personal Computer Memory Card International Association (PCMCIA) option port 31 for receiving an optional card 28. Card 28 is designed to interface with port 31 according to the PCMCIA standard. In the illustrative embodiment card 28 is a memory card containing a plurality of addressable, executable files. Processor 20 interfaces with Port 31 through a number of buffers upon insertion into port 31. Processor 20 controls power to the card.

Figure 2:
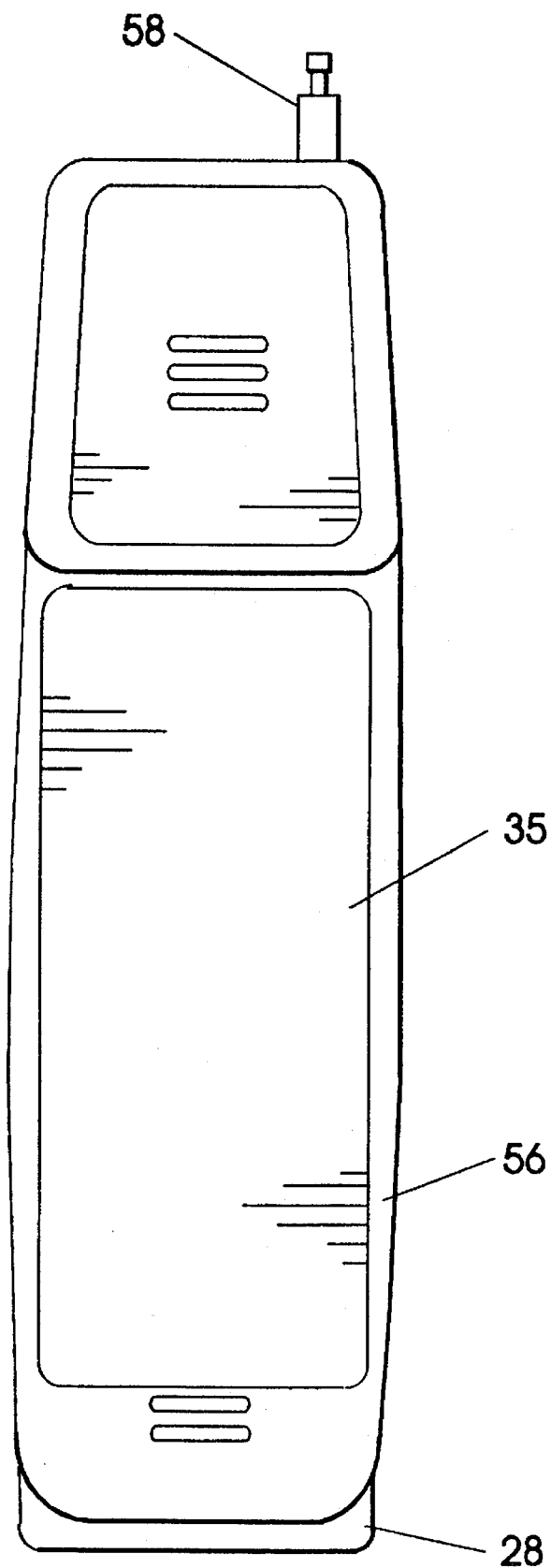
FIG. 2 is a front plan view of the personal communication apparatus of FIG. 1.

FIG. 2 illustrates the front exterior of personal communicator 10. A housing 56 encases the elements of personal communicator 10. The front of housing 56 contains apertures in the upper and lower portions thereof for access to speaker 52 and microphone 54, respectfully. User interface 35 extends through the housing 56 so that touch overlay 26 is exposed and accessible to the user. A retractable antenna 58 protrudes from the upper portion of the housing to facilitate reception of radio frequency signals. Not shown in FIG. 2 are pushbuttons 32, a slot for reception of PCMCIA Card 28 external connector 40, and a cavity in the rear of housing 56 into which main battery 34 is insertable. As described above, personal communicator 10 integrates the architecture of a complete personal computer with a modem and an RF transceiver into a portable, lightweight package which fits in the user's hand or pocket.

Having described the physical architecture of communicator 10, a description of some exemplary applications and their respective graphical user interfaces, as well as a navigation utility for moving between applications, is set forth below in detail. Processor 20 of central controller 16 is based on the architecture of the Intel 8086 processor. An operating system, stored either in ROM 29 or on processor 20 is executed by the processor 20. In the illustrative embodiment, the IBM-PC DOS Operating System is utilized, however, other compatible operating systems may be used. A plurality of applications or executable files are stored in PCMCIA card 28. Upon insertion of card 28 into port 31 processor 20 can access these stored applications.

Figure 3A:
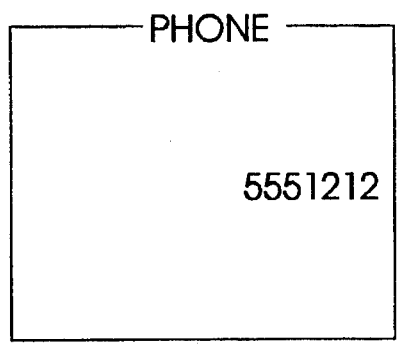
Figure 3A:
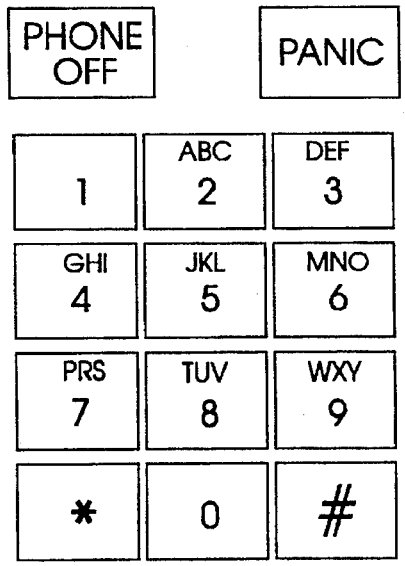
Figure 3A:
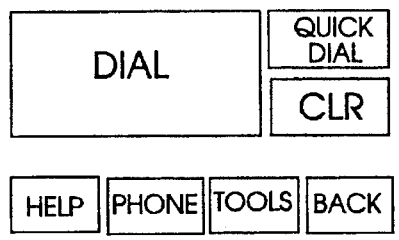
Figure 3E:
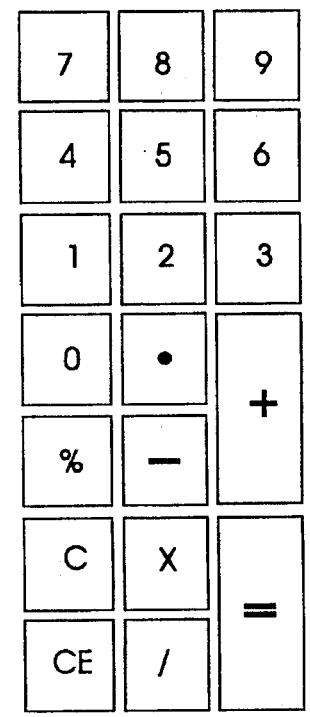
Figure 3E:
Figure 3D:
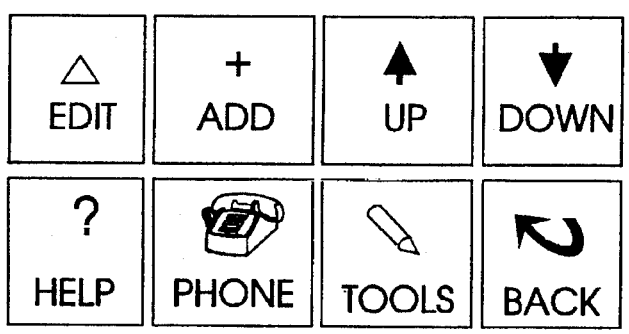

In the contemplated invention, each application stored in card 28 is directed to different functionality and, upon execution, generates a different graphical user interface, as illustrated in FIGS. 3A–E. FIG. 3A illustrates the graphical user interface generated upon execution of a phone emulation application by controller 16. The 12-digit keyboard is displayed graphically on interface 35. When the user touches overlay 26 above the desired key, the processor 20 registers the selected digit and displays it accordingly. FIG. 3B illustrates the graphical user interface generated by execution of an electronic mail application by controller 16. Here, the user may use the touch-screen capability to select any of the displayed options. FIG. 3C illustrates the graphical user interface created by execution of an address book simulation application. FIG. 3D illustrates the graphical user interface generated by execution of a calendar application. FIG. 3E illustrates the graphical user interface generated by execution of a calculator application. From FIGS. 3A–E it can be appreciated that the graphical user interface changes depending on the application currently selected and executing. The screens, keyboards and keypads illustrated in FIG. 3A–E are virtual and can be programmed in the application itself to have numerous configurations, increasing flexibility in the graphical user interface. Each of the graphical user interfaces generated by the exemplary applications includes four option keys at the bottom of interface 35. These option keys are entitled "HELP", "PHONE", "TOOLS", AND "BACK." By selecting any one of these four keys alone or in combination with other virtual keys, the user may select an application for execution different from the currently executing application. To allow users to move quickly and easily from one application to another without having to return to a main menu, a special utility application, hereinafter referred to as the Navigator, executes in tandem with the selected application as described hereafter.

The Navigator is a utility application which allows the user to move quickly and easily from one application to another. The history of file selections made by the user is stored in memory in a queue or internal stack maintained by the Navigator. The basic function of the Navigator is to start execution of the next queued application, a process hereinafter referred to as "spawning". Not counting the operating system, there are only two applications residing in processor 20 at any time, the Navigator utility and a spawned program. The Navigator and spawned program application execute in tandem.

The Navigator maintains an internal memory stack which serves as a queue. The order of entries in the queue correspond to the order in which applications are executed. Each entry in the queue represents the calling sequence for an application. The calling sequence of an application comprises the name of the executable file, the access path, and a number of parameters being passed to that file from another application. These parameters are passed from the currently executing application to the next selected application. For example, if the currently executing job is an address book-type application, such application can call a telephone-type application and pass to it, as a parameter, the character string representing the phone number selected during execution of the address book application. The Navigator sets no limits to the number of parameters that can be associated with the calling sequence of an application. However, the content and format of the calling sequence must be understood by the operating system.

As described previously, the option keys present at the bottom of each virtual screen display, provide the user with a means for moving quickly between frequently used applications. Each of the option keys, except Back, will cause a specific calling sequence to be initiated, causing the associated application to be executed. The Back option key causes the most recently executed application to be executed as explained below.

Figure 4A:
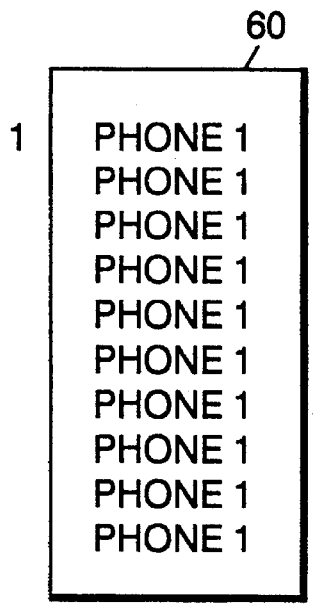
FIGS. 4A–F and 5A–F are conceptual representations of the memory stack maintained by the navigation file utility during execution of a sequence of files.
Figure 4B:
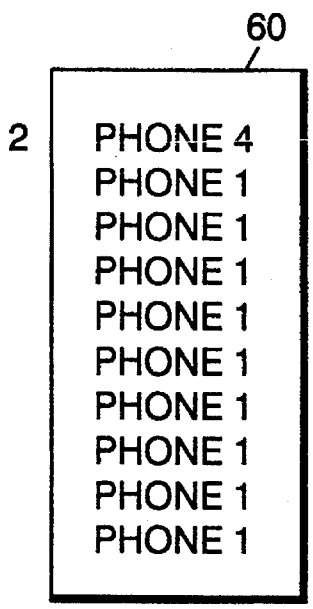
Figure 4C:
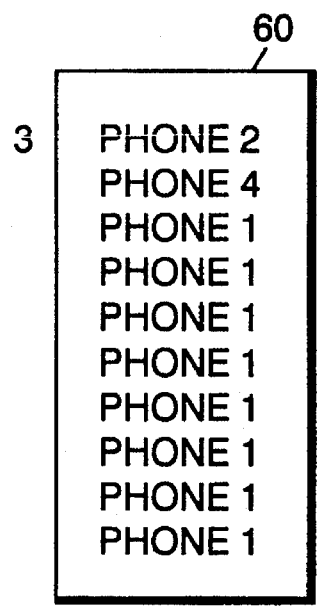
Figure 4D:
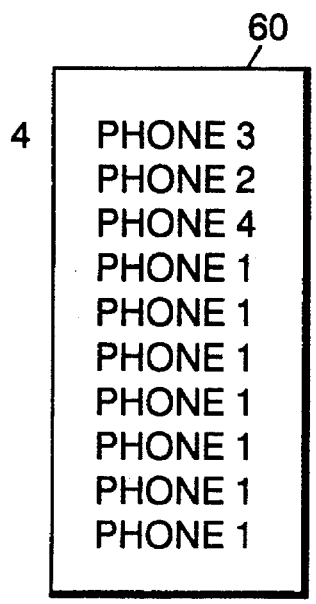
Figure 4E:
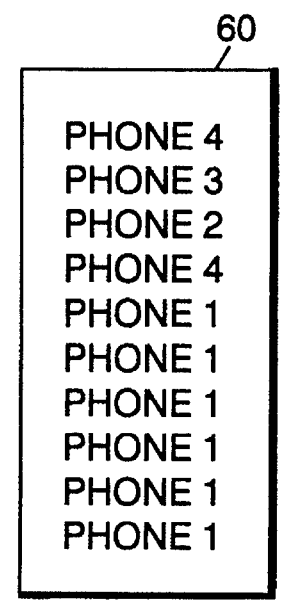
Figure 4F:
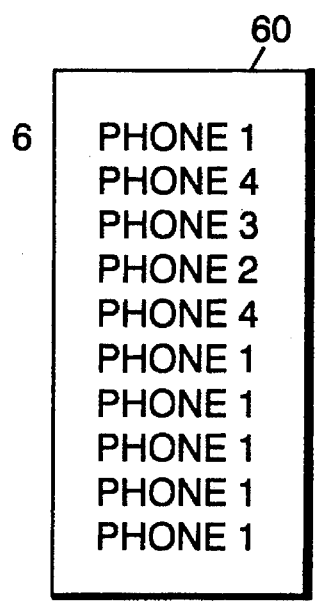
Figure 5A:
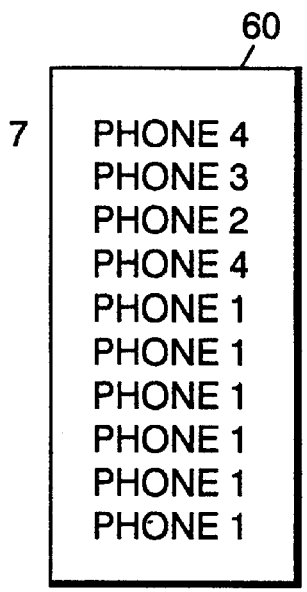
Figure 5B:
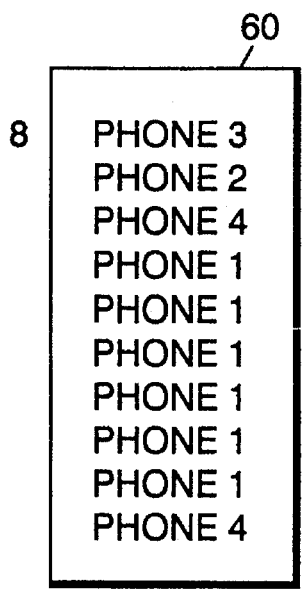
Figure 5C:
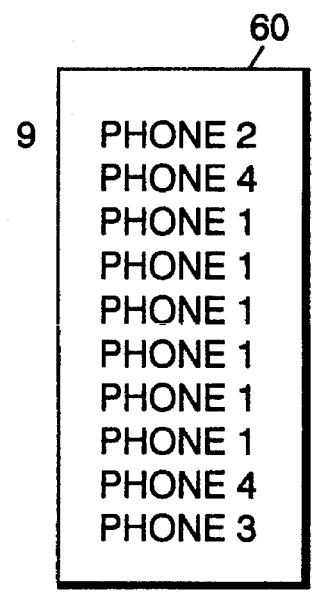
Figure 5D:
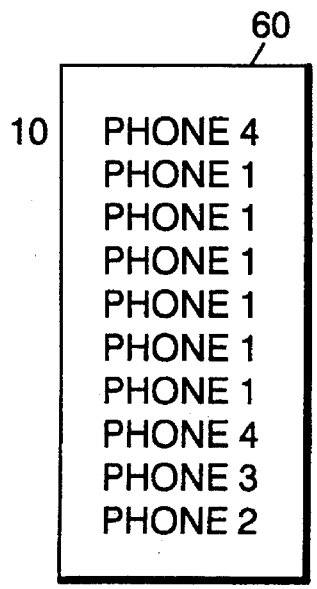
Figure 5E:
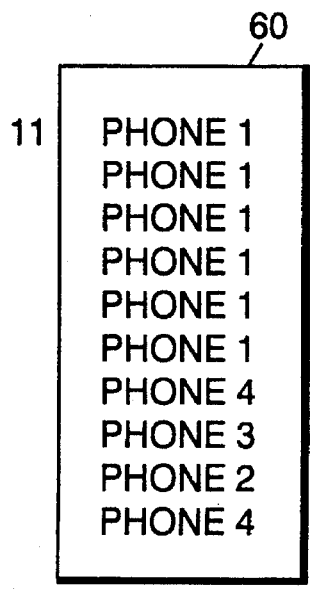
Figure 5F:
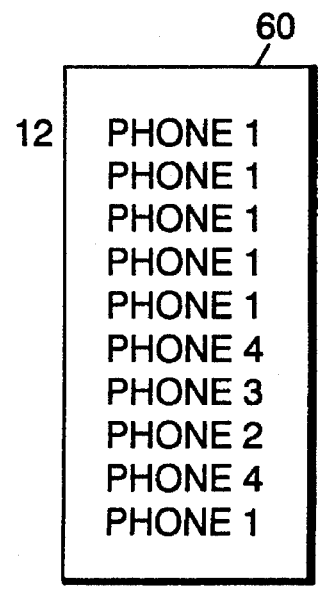

To conceptually illustrate the management of the internal stack by the Navigator, an example is provided wherein a number of generic applications or files entitled Phone 1–4 are selected in the sequence indicated in FIGS. 4A–F and 5A–F. Upon initialization, the internal stack, indicated generally by reference numeral 60, contains default calling sequences, here indicated by Phone 1 in each stack entry. From the graphical user interface of Phone 1 if the user selects the Phone 4 application, the calling sequence for Phone 4 is added to the top entry of stack 60, as indicated in FIG. 4B. From the graphical user interface of Phone 4, if the user selects the Phone 2 application, the calling sequence of Phone 2 is added to the top entry of the stack as indicated in FIG. 4C. In a similar manner, if the user then selects, in sequence, applications Phone 3, Phone 4 and Phone 1, stack 60 will assume the configurations illustrated in FIG. 4D, 4E and 4F respectively. It can be seen that with each new application selected by the user, the calling sequence for that application is placed on the top entry of stack 60. Next, if, from the currently executing application, Phone 1, the user decides to select the previous application, by selection of the BACK option key, the calling sequence of Phone 1 will be popped from the top entry of stack 60 and placed at the bottom entry thereof, as indicated in FIG. 5A. The calling sequence for Phone 4 is now at the top entry of stack 60. Similarly, if the user selects the Back option key again, the calling sequence of Phone 4 will be placed at the bottom entry of stack 60 and the calling sequence for Phone 3 will be present at the top entry of stack 60, as indicated in FIG. 5B. If, in a similar manner, using the BACK option key, the user sequentially moves backward through the calling sequence, selecting applications Phone 2, Phone 4, and Phone 1, the internal stack 60 will assume the configurations illustrated in FIGS. 5C, 5D and 5E, respectively. In each instance of selecting the BACK key, the calling sequence at the top of the stack is placed at the bottom of the stack and the next entry moved to the top entry of stack 60. FIG. 5F illustrates the configuration of stack 60 after the scenario in which the user has selected new files Phone 4, Phone 2, Phone 3, Phone 4 and Phone 1 and then, using the BACK key, back tracks and reexecuted these files in reverse order.

The specific algorithmic steps executed by the Navigator as well as its interaction with a selected application will be described hereafter with reference to FIGS. 6A and B. To assist in the explanation of the algorithmic steps executed by the Navigator application, several variables are defined. STACK is a memory area, such as that illustrated by item 60 in FIGS. 4–5. The STACK may be implemented in software in a manner within the scope of one skilled in the arts. STACK_TOP represents the top entry of STACK. STACK_BOTTOM represents the bottom entry of the STACK. TEMP and CMD_LINE are variables which hold an ASCII character string representing the calling sequence of an application to be executed. CMD_LINE_ADDR represents the address of the CMD_LINE variable in memory. NAVSTAK represents a location within the DOS environment where an application can find the value of CMD_LINE_ADDR. CODE is a value returned from a currently executing application to the Navigator application, as defined hereinafter.

Figure 6A:
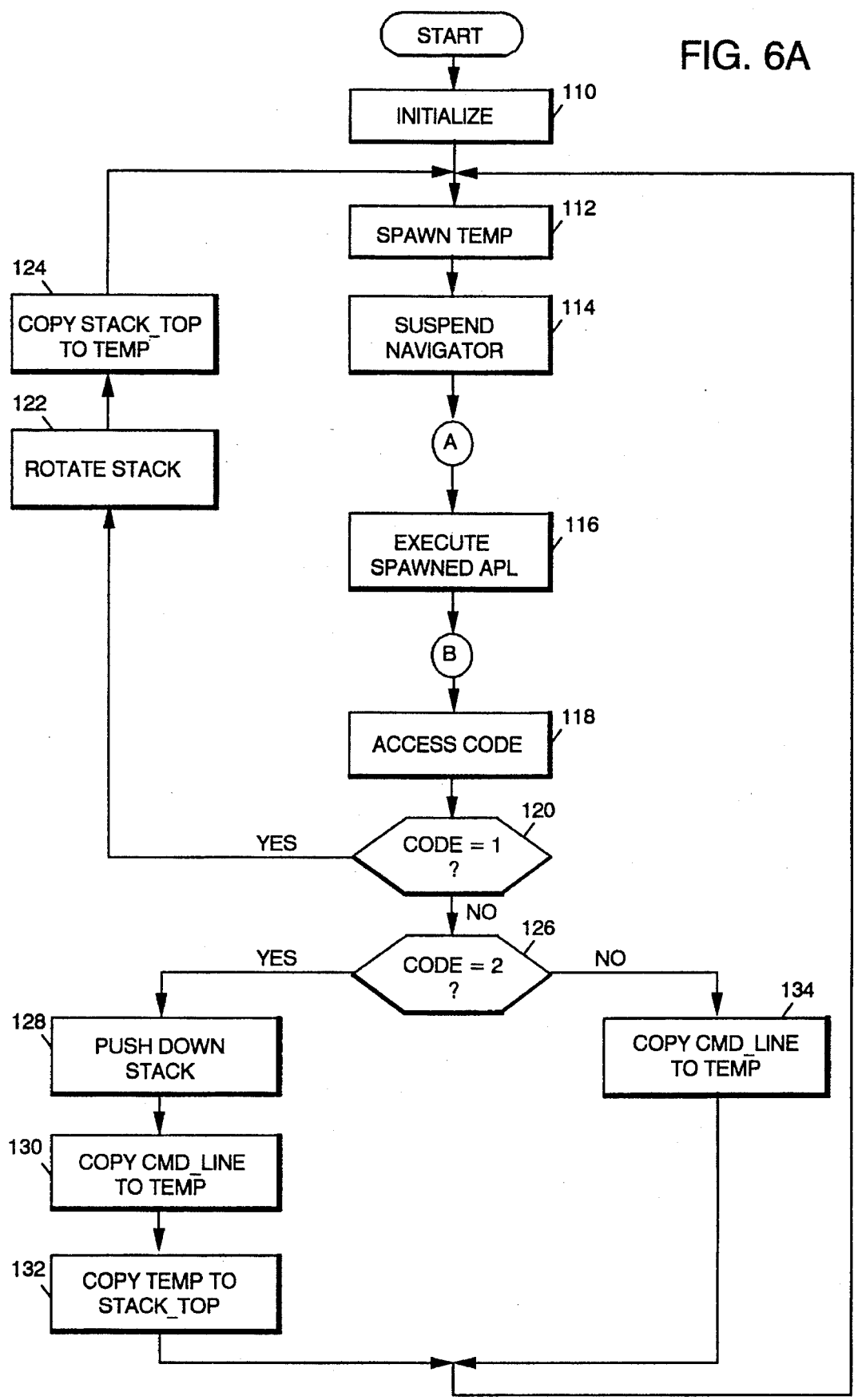
FIG. 6A illustrates the algorithmic steps executed by the navigation utility in accordance with present invention.

Referring now to FIG. 6A, upon power up of communicator 10, the Navigator goes through a number of initialization steps, indicated by procedural block 110. These steps include initializing all entries of STACK to a default calling sequence, and placing the same default calling sequence in the TEMP variable. The CMD_LINE variable is defined and the address of CMD_LINE, CMD_LINE_ADDR, is written to the DOS environment, i.e. NAVSTACK. Next, the Navigator executes or spawns the calling sequence of the application present in the TEMP variable, as indicated by procedural block 112. At this point, execution of Navigator suspends, as indicated by block 114. Next, the spawned application executes creating a graphical user interface and providing functionality to the user, as previously defined. Execution of the spawned application is indicated by block 116 and is defined in greater detail in the flow chart of FIG. 6B.

Figure 6B:
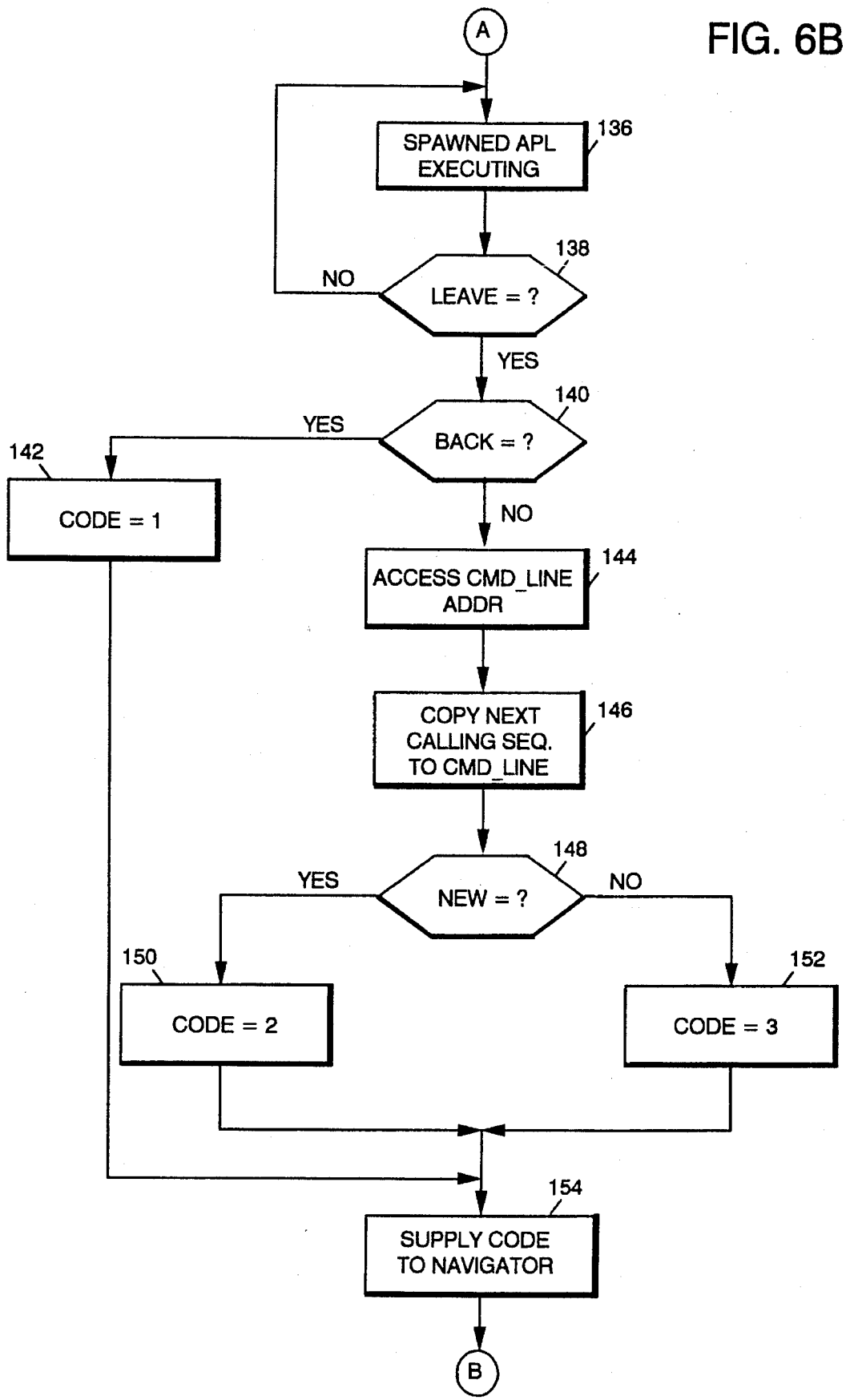
FIG. 6B illustrates the algorithmic steps executed by an application in accordance with present invention.

Referring to FIG. 6B, the algorithmic steps executed by the currently spawned application are illustrated. The spawned application providing functionality and a graphical user interface to the user, as indicated in procedural block 136. If the user has not selected one of the option keys, execution of the spawned application continues, as indicated by the NO branch of decisional step 138. If the user has selected one of the option keys, as indicated by the YES branch of decisional block 138, a determination is made as to which option key has been selected, as indicated in decisional block 140. If the user has selected the BACK option key, the spawned program sets the CODE variable equal to "1", as indicated by procedural block 142. If the user selects other than the BACK option key, a new application is to be selected, and the calling sequence thereof is to be written to the STACK_TOP. The currently executing application retrieves CMD_LINE_ADDR variable from the operating system environment, as indicated by block 144. Next, a copy of the calling sequence for the next selected application is written into the CMD_LINE variable, as indicated by block 146. Next, the currently spawned application determines if the calling sequence of the next selected application should be written to STACK_TOP, as indicated in decisional block 148. If so, the currently executing application then sets the CODE variable equal to "2", as indicated by block 150. In the event that the next selected application should not be written to STACK_TOP, the spawned program sets the code variable to "3", as indicated in block 152. The determination of whether or not the newly selected application should be written to STACK_TOP is programmed into the code of the actual application by the designer. Accordingly, all spawned applications prior to their termination will set the value of the CODE variable appropriately. The spawned application will then terminate, leaving the CODE variable in an address accessible by the Navigator utility, as indicated in step 154.

The spawned application having terminated, the Navigator program accesses the value of CODE variable, as indicated by block 118 in FIG. 6A. If the value of code is equal to "1", as determined in decisional block 120, the Navigator rotates the STACK, as indicated by procedural block 122. Rotation of the STACK occurs by setting the current value of STACK_TOP to a temporary variable, and shifting content of each of the STACK locations to the next higher STACK location. The value of STACK_BOTTOM is then set to the value of STACK_TOP in a manner within the scope of those reasonably skilled in the art. Next, the Navigator copies the value from STACK_TOP to the TEMP variable, as indicated in procedural block 124. The TEMP variable contains the calling sequence of the next application to be spawned, which in this instance, is the previously executed application since the user selected the BACK option key.

If the value of the CODE variable equals "2", indicating a new application which should be written to STACK_TOP, the Stack is pushed down, as indicated by procedural block 128. In pushing down the STACK, each STACK location is written to the next lower STACK location, with the content of the lowest Stack location disappearing. Next, the contents of the CMD_LINE variable are copied to the TEMP variable, as indicated by procedural block 130. The contents of the TEMP variable are then copied to the Stack_Top variable, as indicated by procedural block 132. In this manner, procedural steps 128–132 ensure that the calling sequence of the next application to be spawned is recorded in the STACK for later retrieval.

If the CODE variable equals "3", indicating that the calling sequence of the next application to be spawned should not be recorded in the STACK, the content of the CMD_LINE variable is copied to the TEMP variable, as indicated in procedural block 134. However, the value of TEMP is not subsequently copied to the STACK_TOP variable, therefore, the occurrence of the next spawned application will not be recorded into the sequence of file executions maintained by the Navigator. Next, returning to the top of the flow diagram, the Navigator spawns the application whose calling string can be found in the TEMP variable, as indicated in procedural block 112.

As can be appreciated, the Navigator utility executes in a continuous loop and suspends execution only once another application has been spawned. Upon termination of the spawned application, the Navigator determines the calling sequence of the next application to be spawned and modifies the STACK as necessary.

Figure 7:
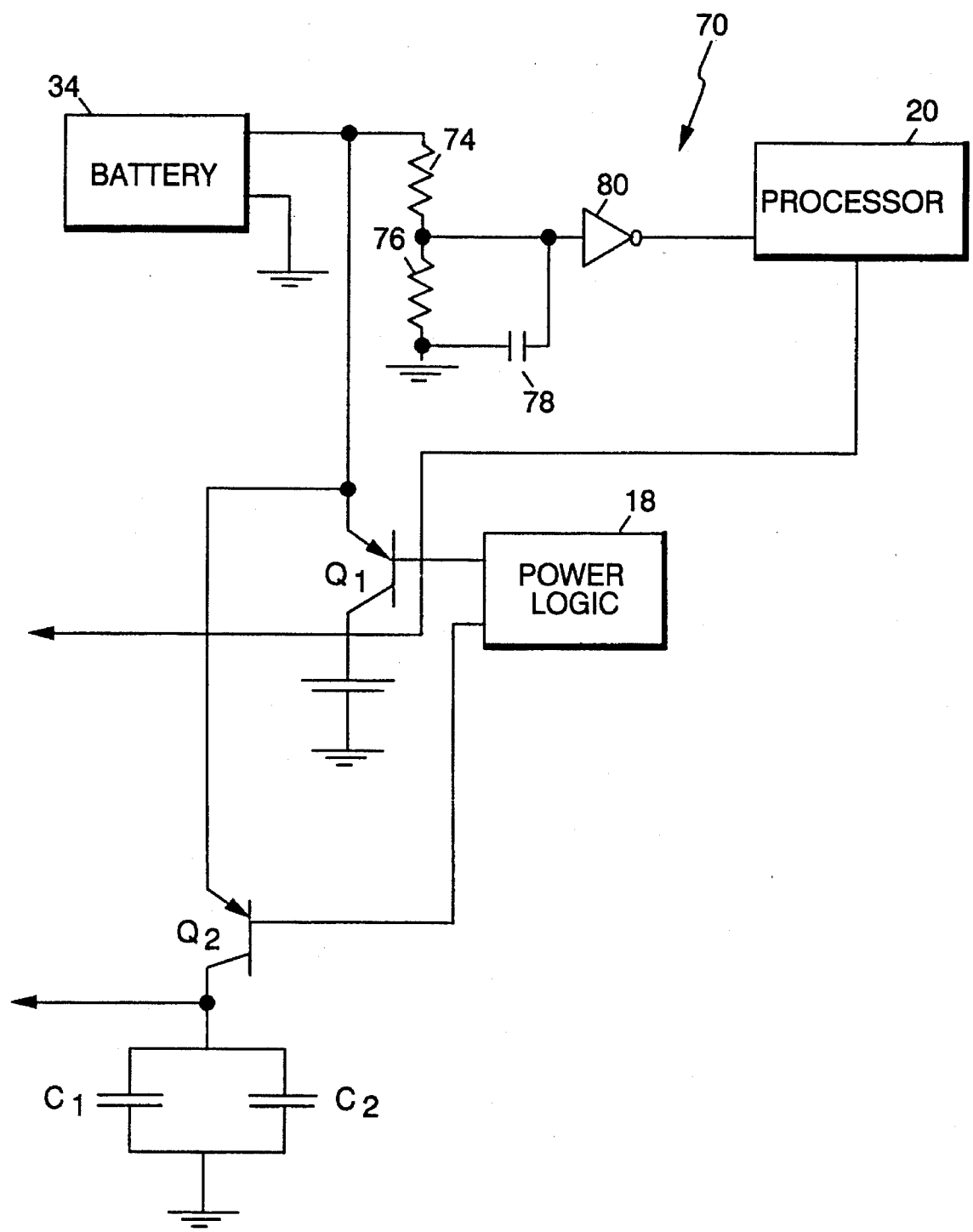
FIG. 7 is a schematic representation of an early warning circuit implemented within the personal communication apparatus of FIG. 1.

In the contemplated invention, even after loss of power by personal communicator 10, the Navigator will continue execution from the state at which power was lost. To assist in an orderly shutdown of communicator 10 by processor 20 upon the loss of power or the voltage from main battery 34 falling below acceptable logic levels, a special early warning circuit 70 is implemented within a communicator 10, as indicated in FIG. 7. Circuit 70 comprises resistors 74 and 76, capacitor 78 and logic buffer 80. Resistors 74 and 76 are configured as illustrated to function as a voltage divider, with capacitor 78 performing a filter function. Logic buffer 80 further conditions the signal from the power supply to a level which is acceptable to processor 20. By selecting appropriate values for resistors 74 and 76, and capacitor 78, the output of battery 34 appears to processor 20, not as a power signal but as a logic signal. Power is supplied to processor 20 and the other elements of communicator 10 via $Q_1$ and $Q_2$, as controlled by power supply logic 18. In this manner, battery 34 is coupled to processor 20 through both a power connection and an early warning logic signal. Upon removal of battery 34 from communicator 10 or power levels from the battery falling below an unacceptable level, the level of the signal present at the output of buffer 80 will change. This change will cause a non-maskable interrupt in processor 20. Upon receiving the non-maskable interrupt, processor 20 will execute a shutdown algorithm in which the PC counter, working registers, etc., are stored in an orderly manner in anticipation of power loss. Simultaneously, upon removal of the battery or loss of power, capacitor C1 and C2 discharge, with the time for discharge defining the window in which processor 20 can perform an orderly shutdown routine. The volatile memory in communicator 10 is maintained by backup battery 30 as indicated.

Upon inserting a new battery into communicator 10, processor 20, will be able to resume execution at the point in which power was lost. As such, circuit 70 provides an early warning to processor 20 which enables the processor to perform an orderly shutdown and resume once power is restored.

It can be appreciated from the foregoing that the present invention provides a personal communicator which integrates the functionality of the personal computer with that of a cellular telephone and provides the user with a virtual graphical interface which can be reconfigured according to the application currently executing. Furthermore, the Navigator program provides a means for the user to move from one application to the other quickly and conveniently.

Accordingly, it will be appreciated that the detailed disclosure has been presented by way of example only and is not intended to be limiting. Various alterations, modifications and improvements will readily occur to those skilled in the art, and may be practiced without departing from the spirit and scope of the invention. The invention is limited only as required by the following claims and equivalents thereto.

What is claimed is:

1. A hand-held personal communication apparatus comprising:

a radio frequency transceiver;

audio logic circuitry coupled to said radio frequency transceiver to permit audio data to be received and transmitted by a user;

a digital processor;

a modem coupled to said digital processor and said radio frequency transceiver to permit digital data to be received and transmitted by a user;

a memory coupled to said digital processor for storing a plurality of communication application programs, each of said plurality of communication application programs initiating execution in response to a selected calling sequence and including executable program code for generating at least one graphic image, said at least one graphic image including at least one designated user input area;

a display coupled to said digital processor for displaying a graphic image;

a touch sensitive overlay coupled to said digital processor and overlaying said display for generating file execution commands in response to user touch commands within a designated user input area;

a navigation file stored in said memory, said navigation file including a plurality of ordered entries, each of said ordered entries comprising a calling sequence for one of said plurality of communication application programs; and a navigation program stored within said memory and executable by said digital processor in tandem with each of said plurality of communication application programs for accessing said navigation file and initiating a selected calling sequence in response to a user touch command within a designated user input area wherein a user may efficiently move from one communication application program to another communication application program with minimal user inputs while utilizing said personal communication apparatus.

2. A hand-held personal communication apparatus according to claim 1, further including a port for receiving an external memory medium having stored thereon a second plurality of application programs.

3. A hand-held personal communication apparatus according to claim 1, wherein at least one of said ordered entries within said navigation file inlcudes at least one parameter to be passed to a communication application program in association with said calling sequence.

4. A hand-held personal communiation apparatus according to claim 1, further including a battery power supply coupled to said radio frequency transceiver and said digital processor.

* * * * *